(12) United States Patent
Wallace et al.

(10) Patent No.: US 11,370,213 B2
(45) Date of Patent: Jun. 28, 2022

(54) APPARATUS AND METHOD FOR REMOVING PAINT FROM A SURFACE

(71) Applicant: Darcy Wallace, Watseka, IL (US)

(72) Inventors: Gail Wallace, Kankakee, IL (US); Byron Wallace, Watseka, IL (US)

(*) Notice: Subject to any disclaimer, the term of this patent is extended or adjusted under 35 U.S.C. 154(b) by 0 days.

(21) Appl. No.: 17/078,851

(22) Filed: Oct. 23, 2020

(65) Prior Publication Data

US 2022/0126560 A1   Apr. 28, 2022

(51) Int. Cl.
*B32B 43/00* (2006.01)
*B32B 38/10* (2006.01)

(52) U.S. Cl.
CPC ........... *B32B 43/006* (2013.01); *B32B 38/10* (2013.01); *Y10T 156/1158* (2015.01); *Y10T 156/1917* (2015.01)

(58) Field of Classification Search
CPC . B32B 38/10; B32B 43/006; Y10T 156/1158; Y10T 156/1917
See application file for complete search history.

(56) References Cited

U.S. PATENT DOCUMENTS

| | | | |
|---|---|---|---|
| 2,221,318 A * | 11/1940 | Worthing | B44D 3/168 392/409 |
| 2,680,188 A | 6/1954 | Stephens | |
| 2,694,135 A * | 11/1954 | Brockmole | E04G 23/006 392/409 |
| 4,421,048 A | 12/1983 | Adema et al. | |
| 4,867,796 A | 9/1989 | Asmus et al. | |
| 5,328,517 A * | 7/1994 | Cates | B08B 7/0035 134/1 |
| 5,590,238 A | 12/1996 | Ericson | |
| 5,656,096 A | 8/1997 | Van Alstyne | |
| 5,751,897 A | 5/1998 | Van Alstyne | |
| 6,122,438 A | 9/2000 | Scherzer | |
| 6,262,431 B1 | 7/2001 | Scherzer | |
| 6,277,202 B1 | 8/2001 | Asmus | |
| 6,304,721 B1 | 10/2001 | Ericson | |
| 6,421,503 B2 | 1/2002 | Grob et al. | |
| 6,368,554 B1 | 4/2002 | Wajsfelner et al. | |
| 6,437,292 B1 * | 8/2002 | Sikka | C21D 1/09 219/386 |
| 6,448,570 B1 | 9/2002 | Scherzer et al. | |
| 6,534,904 B1 | 3/2003 | Dieudonne et al. | |
| 6,591,062 B2 | 7/2003 | Scherzer et al. | |
| 6,713,945 B2 | 3/2004 | Fuchs et al. | |
| 6,765,339 B2 | 7/2004 | Dieudonne et al. | |
| 6,909,841 B2 | 6/2005 | Linow et al. | |

(Continued)

*Primary Examiner* — Philip C Tucker
*Assistant Examiner* — Nickolas R Harm
(74) *Attorney, Agent, or Firm* — Hartman Global IP Law; Gary M. Hartman; Domenica N. S. Hartman

(57) ABSTRACT

Apparatuses and methods adapted for removing a layer of paint, sealant, or adhesive from a surface of an article, including wooden, metal, plaster, stone, and brick articles. The apparatuses are provided with a module comprising at least one carbon infrared emitter bulb that generates short-wavelength infrared radiation. The module has an opening through which the infrared radiation is emitted from the module, and the intensity and wavelengths of the infrared radiation are controlled to selectively attain temperatures in a range of about 90 to 375° C. at the surface of the article when located a distance of about 5 to 15 centimeters from the opening of the module.

13 Claims, 7 Drawing Sheets

(56) References Cited

U.S. PATENT DOCUMENTS

| | | |
|---|---|---|
| 6,943,362 B2 | 9/2005 | Linow |
| RE40,181 E | 3/2008 | Scherzer et al. |
| 7,947,335 B2 | 5/2011 | Werdecker et al. |
| 8,210,889 B2 | 7/2012 | Reith et al. |
| 8,436,523 B2 | 5/2013 | Linow |
| 8,442,391 B2 | 5/2013 | Ericson |
| 8,785,894 B2 | 7/2014 | Linow |
| 9,027,246 B2 | 5/2015 | Linow |
| 9,248,425 B2 | 2/2016 | Linow et al. |
| 9,269,560 B2 | 2/2016 | Klumpp et al. |
| 2007/0280654 A1* | 12/2007 | Ericson ................. B44D 3/168 392/410 |
| 2010/0000977 A1* | 1/2010 | Sudhakar ............. B08B 7/0042 219/121.69 |
| 2010/0219355 A1 | 9/2010 | Linow |
| 2011/0044060 A1 | 2/2011 | Klinecky et al. |
| 2012/0018423 A1 | 1/2012 | Linow |
| 2013/0234049 A1 | 9/2013 | Linow |
| 2014/0175162 A1 | 6/2014 | Argue et al. |
| 2014/0191651 A1 | 7/2014 | Klumpp et al. |
| 2014/0209375 A1 | 7/2014 | Linow et al. |
| 2015/0313090 A1 | 11/2015 | Weiss et al. |
| 2016/0311248 A1* | 10/2016 | Ericsson .............. H05B 3/0038 |
| 2019/0186163 A1* | 6/2019 | Li ............................ E04H 1/02 |

* cited by examiner

APPARATUS AND METHOD FOR REMOVING PAINT FROM A SURFACE

BACKGROUND OF THE INVENTION

The present invention generally relates to apparatuses and methods for removing paints, sealants, and adhesives from surfaces. The invention particularly relates to apparatuses and methods that utilize short-wavelength radiation to remove paints, sealants, and adhesives from surfaces, for example, surfaces of wooden, metal, plaster, stone, and brick articles.

The preservation and restoration of old and historic buildings and other architectural materials and structures are of great interest. Challenges exist when attempting to preserve and restore private, commercial, governmental, institutional, and industrial buildings, structures, and articles that have a high volume of painted wood and/or metal surfaces, some of which may be highly detailed. Nonlimiting examples include highly detailed windows, frames, trim, doors, etc., of old and sometimes historically sensitive museums, monuments, universities, federal buildings, and other important sites. Stripping paint to bare wood prior to repainting optimizes the new paint film's long term performance and preserves historic fabric (the term for wood and other original material in the context of the Secretary of the Interior's Standards for Rehabilitation of Historic Buildings, codified in 36 CFR § 67) by eliminating frequent surface disturbances otherwise required for intermittent repainting over a given period of time.

While the removal of paint is commonly encountered when attempting to preserve and restore a building or other structure, removal of sealants and adhesives may also be required for a particular structure. For example, old sealants and adhesives, including but not limited to putty glazing, silicones, urethanes, glues, and epoxies, are preferably completely removed so that they can be replaced by new and more advanced sealants and adhesives. Failure to completely remove a pre-existing sealant or adhesive can compromise the integrity of the new sealant or adhesive through poor adhesion and, in some case, outright chemical or physical incompatibility.

There is a demand for mechanically-assisted, rapid, non-hazardous, and safe solutions capable of meeting the demands of high volume paint, sealant, and/or adhesive stripping in the field at job sites as well as offsite restoration facilities, while also meeting the requirements of strict safety and abatement rules applicable to the removal of paints, sealants, and adhesives. Although the benefit of creating an appropriate surface for optimal adhesion of paint coating layers is recognized by wood and metal material scientists and paint technologists, the onerous task of paint removal is rarely done by professional painters in the field, and instead is more commonly done by restoration professionals at offsite locations.

Current stripping techniques used in the field include the application of a heavy paper that is embedded with chemicals and can be attached to a painted wooden surface. After a day or so of dwell time, the paper can be peeled away carrying with it the paint removed from the wooden surface. The chemical embedded on the paper changes the pH of the wood, which must then be neutralized to avoid degradation of the wood. This technique carries the risk of the chemicals being reactivated if pH neutralization is not confirmed. The most widely-used stripping techniques for offsite stripping have largely relied on chemical stripping, in which a painted article is immersed in a stripping chemical, for example, solvents such as methylene chloride. However, methylene chloride is toxic and highly volatile, and therefore an inhalation hazard when used as a chemical stripper. Additionally, methylene chloride carries the risk of unintentional reactivation if the stripped surface is sufficiently warmed, for example, by sunlight, to bring residual chemical to the surface. Other chemical strippers commonly used to remove paint, including caustic or solvent-type chemicals, are also toxic and their disposal following use poses environmental issues. Though stripping chemicals have been developed that are not toxic, they have not generally been proven to be as effective as traditional stripping chemicals such as methylene chloride.

U.S. Pat. No. 2,221,318 to Worthing et al. discloses the ability of infrared (IR) radiation to remove paint from wooden structures. Various types of equipment that utilize infrared radiation to remove paint are disclosed in, as examples, U.S. Pat. Nos. 5,590,238, 6,304,721, and 8,442,391. Though various IR emitters are known, including carbon emitters available for welding plastics, current IR devices commercially available for paint removal and other purposes utilize emitters with tungsten filaments. One such example is a device commercially available under the name "Speedheater" from Eco-Strip, LLC. The Speedheater device is small and lightweight and therefore well suited for handheld operation. However, use of the Speedheater in high production settings has evidenced certain limitations, including no means for temperature control, the need to allow the device to cool down approximately every thirty minutes, slow delivery time, and relatively short bulb life. IR devices that utilize tungsten filaments are also widely used to dry and cure water-based coatings in the automobile industry and to cure powder coatings on complex components.

Notwithstanding the advancements noted above, it would be desirable if improved equipment and methods were available for removing paints, sealants, and adhesives from surfaces of wooden and metal structures and articles. Such equipment and methods would be particularly desirable if they could be adapted to be suitable for use in the field at job sites as well as at offsite locations, capable of high volume productions with mechanical mobility, have quick response times for start up and cool down, provide consistent and constant heat penetration, and rapidly remove paints, sealants, and adhesives from wooden and metal structures and articles whose surfaces are detailed or otherwise have surface features that make paint removal relatively difficult, for example, detailed windows, frames, trim, doors, grilles, railings, etc., of old and in some cases historical buildings, structures, and articles.

BRIEF DESCRIPTION OF THE INVENTION

The present invention provides methods and apparatuses that utilize short-wavelength infrared radiation to remove paints, sealants, and/or adhesives from wooden, metal, plaster, stone, and brick surfaces of buildings, structures, and articles (collectively referred to herein as "article(s)"), and preferably are suitable for use in high production settings.

According to one aspect of the invention, such an apparatus includes a module having at least one carbon infrared emitter bulb that generates infrared radiation. The module has an opening through which the infrared radiation is emitted from the module, and a control unit is adapted to control the intensity of the infrared radiation and control wavelengths of the infrared radiation to have a peak in a range of 1.7 to 3 micrometers to selectively attain temperatures in a range of about 90 to 375° C. at the surface of the article when located a distance of about 5 to 15 centimeters from the opening of the module.

According to another aspect of the invention, a method of removing a layer of paint, sealant, or adhesive from a surface of an article entails generating infrared radiation with at least one carbon infrared emitter bulb, emitting the infrared radiation through an opening of a module that contains the at least one carbon infrared emitter bulb, controlling the intensity of the infrared radiation and controlling wavelengths of the infrared radiation to have a peak in a range of 1.7 to 3 micrometers to selectively attain temperatures in a range of about 90 to 375° C. at the surface of the article while the article is located a distance from the opening of the module, emitting the infrared radiation for a period of time sufficient to soften the layer on the article, and removing the layer from the article.

Technical effects of the methods and apparatuses described above preferably include the ability to rapidly remove paint, sealant, and/or adhesive from a surface at high production rates without damaging the underlying substrate, for example, a wooden, metal, plaster, stone, or brick article. The methods and apparatuses are particularly effective when used to remove paints, sealants, and/or adhesives from a variety of articles of different shapes and sizes, and which may require removal and/or partial or complete disassembly in order to completely remove paints, sealants, and/or adhesives from their surfaces.

Other aspects and advantages of this invention will be appreciated from the following detailed description.

DETAILED DESCRIPTION OF THE INVENTION

Figure 1:
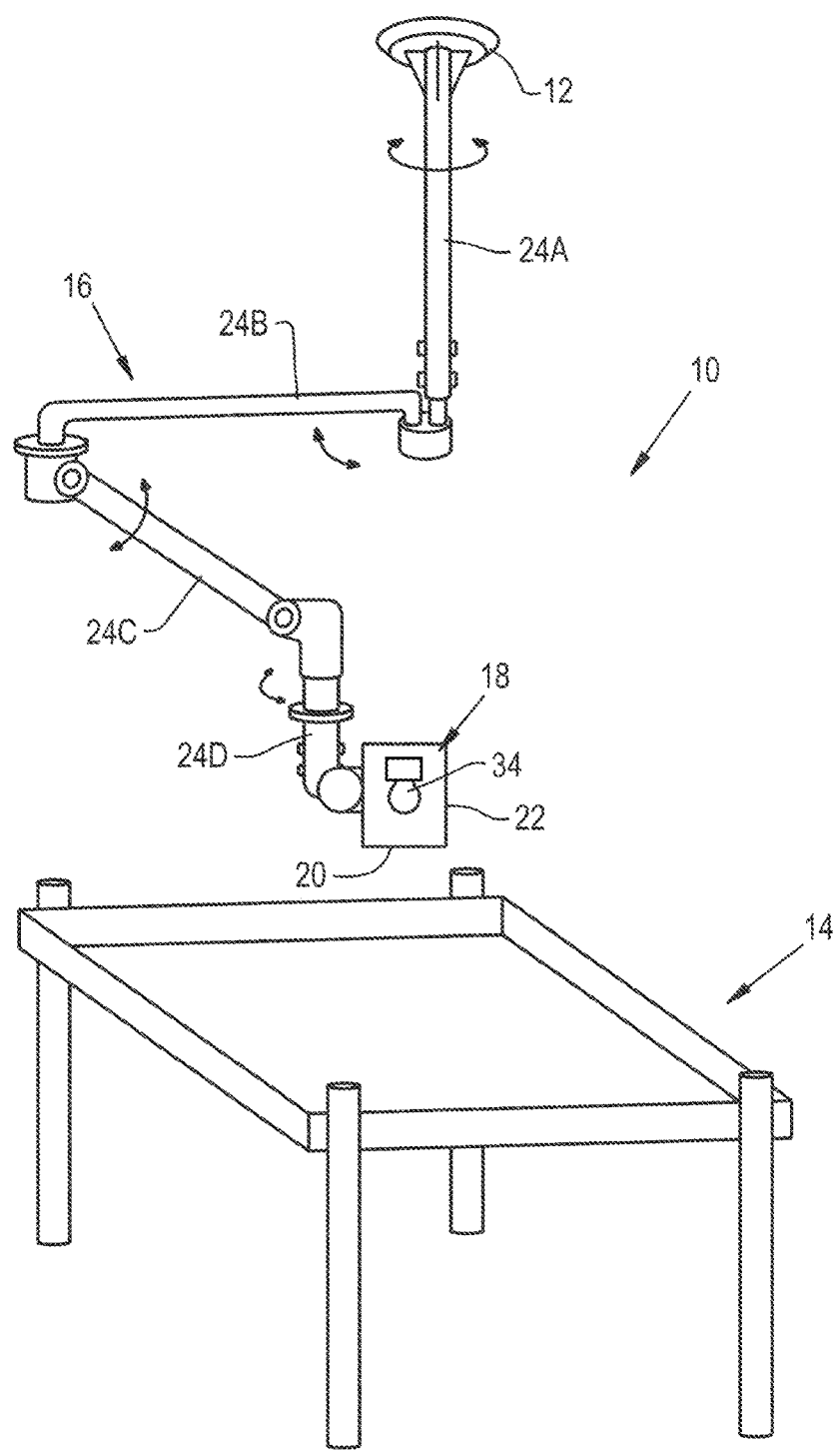
FIG. 1 is a schematic representation of an apparatus equipped with an infrared radiation module to remove paints, sealants, and/or adhesives from surfaces in accordance with a nonlimiting embodiment of this invention.
Figure 2:
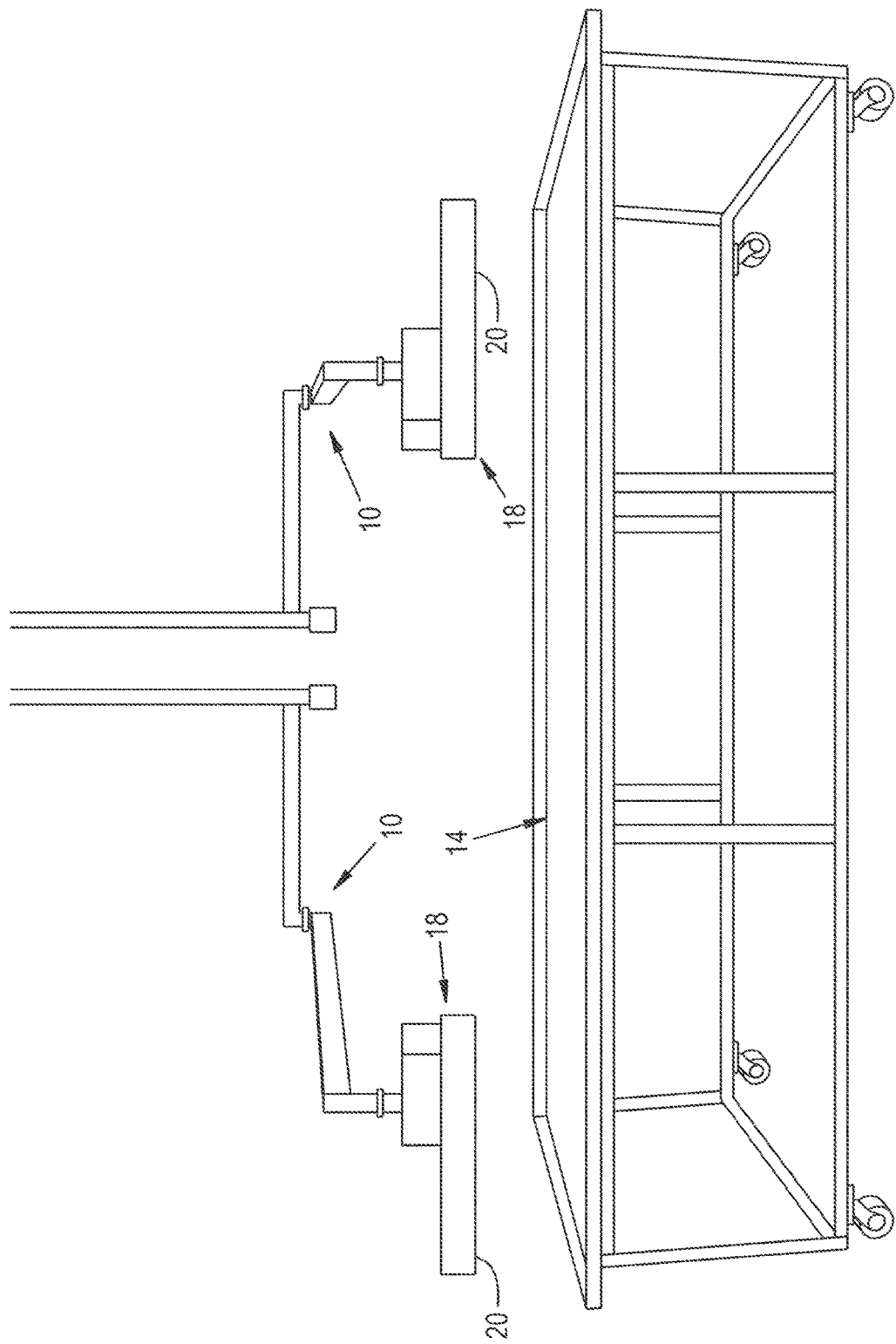
FIG. 2 represents two apparatuses of the type represented in FIG. 1 in an industrial setting.
Figure 3:
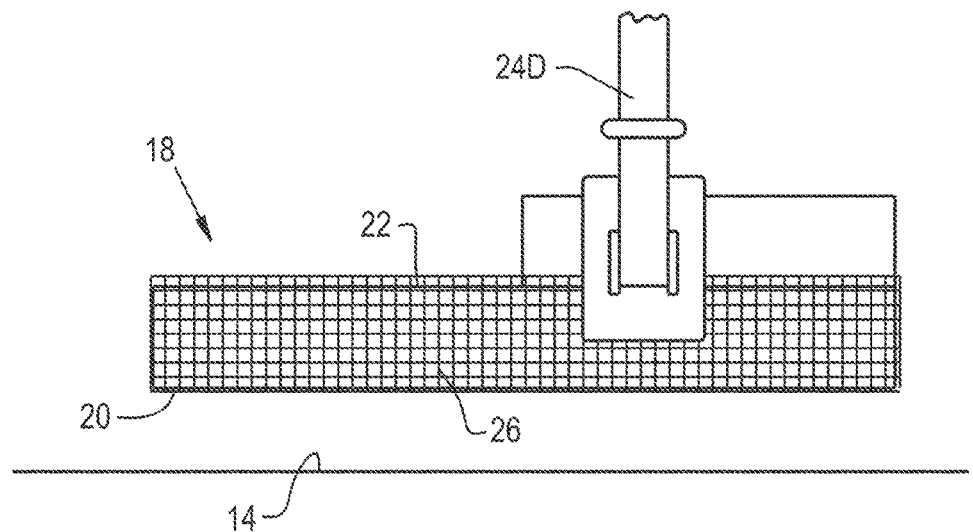
FIGS. 3 and 4 represent two views of an infrared radiation module of one of the apparatuses represented in FIG. 2.

FIGS. 1 through 8 represent various embodiments and aspects of apparatuses adapted for removing paints, sealants, and/or adhesives from surfaces of wooden and metal articles, as nonlimiting examples, detailed windows, frames, trim, doors, etc., of historical buildings, metal grilles, railings, safety barriers, etc., often present in residential, commercial, industrial, and military settings, and metal surfaces of various other residential, commercial, industrial, and military structures, such as surfaces of aircraft. It is believed that paints, sealants, and adhesives can be removed from a wide variety of metal surfaces, including but not limited to steel alloys and aluminum alloys. Paints, sealants, and adhesives can also be removed from other substrate materials, including plaster, stone, and brick articles.

The drawings are drawn for purposes of clarity when viewed in combination with the following description, and therefore are not necessarily to scale. Although the invention will be described hereinafter in reference to particular apparatuses and components schematically identified in the drawings, it should be noted that the teachings of the invention are not limited to these particular apparatuses and components. To facilitate the description provided below of the embodiments represented in the drawings, relative terms, including but not limited to, "vertical," "horizontal," "upper," "lower," "above," "below," etc., may be used in reference to the orientations of the apparatuses during their operation, and therefore are relative terms that indicate the construction, installation and use of the apparatus and therefore help to define the scope of the invention.

FIG. 1 represents an embodiment of an apparatus 10 that comprises a base 12, a platform 14 for supporting a wooden or metal article (not shown), and an armature 16 that couples a module 18 to the base 12. The module 18 is adapted to emit infrared radiation (IR) through an opening 20 at a lower longitudinal side of a housing 22 in which one or more IR emitters are housed. According to a preferred aspect of the invention, the module 18 utilizes one or more infrared emitter bulbs 34 that contain one or more carbon filaments. During investigations leading to the present invention, it was determined that, when directed at a wooden or metal article having a surface bearing paint, sealant, or adhesive, infrared radiation generated by a carbon infrared emitter bulb was able to rapidly heat, penetrate, and loosen a layer of paint, sealant, or adhesive without damaging or excessively heating the underlying wood or metal substrate. Though not wishing to be held to any particular theory, subsequent research indicated that carbon infrared emitter bulbs emit short-wavelength infrared radiation (which as used herein refers to the International Commission on Illumination (CIE) standard IR-B, having wavelengths of 1.400-3.000 micrometers), in contrast to tungsten infrared emitter bulbs whose tungsten filaments are reported to emit near-infrared wavelengths (which as used herein refers to CIE standard IR-A; wavelengths of 0.700-1.400 micrometers) to short-wavelength infrared radiation with peak wavelengths of less than 2 micrometers. Investigations leading to the present invention indicated that short-wavelength IR radiation emitted by tungsten filaments (peak wavelengths of less than 2 micrometers) penetrated paint layers and their underlying wood substrates, which would ordinarily be advantageous by ensuring uniform heating, but led to excessive heating of wood substrates. The investigations also indicated that short-wavelength IR radiation emitted by tungsten filaments (peak wavelengths of greater than 2 micrometers) exhibited long response times (heating). Both of these characteristics appeared to contribute to an inferior stripping capability. In contrast, investigations leading to this invention showed that carbon infrared emitter bulbs, if their power levels are properly regulated to achieve IR radiation wavelengths having a peak in the range of 1.7 to 3 micrometers when stripping wood, steel, masonry, plaster and aluminum substrates, exhibit fast response times (about two seconds or less), which is believed to promote the ability of the infrared radiation to partially penetrate a layer of paint, sealant, or adhesive and perform fast degradation of binders within the layer. Particular examples include operating a carbon infrared emitter bulb at a power setting of about less than its maximum rated power level to achieve a power density (infrared intensity) of about 110 kW/m² and IR radiation wavelengths having a peak in the range of 2.7 to 3 micrometers, preferably 2.89 micrometers, when stripping wood and other cellulosic substrates, and IR radiation wavelengths having a peak in the range of 1.7 to 2 micrometers when stripping steel substrates.

Other operating characteristics of IR radiation generated by carbon filaments may also affect the results obtained with carbon infrared emitter bulbs, for example, a high power density (infrared intensity) (kW/m²) and a maximum specific power (W/cm) that is intermediate near-infrared wavelength and short-wavelength tungsten filament emitters. Other desirable aspects of carbon infrared emitter bulbs that were investigated during the development of the present invention included the ability to concentrate heating for rapid penetration, long cycles of continuous production use, estimated bulb lives of about 15,000 hours, and the ability to utilize a controller to accurately control the temperature of a targeted paint, sealant, or adhesive layer being heated on a wooden or metal article. Furthermore, carbon infrared emitter bulbs are available in various sizes, enabling the width and length of the module 18 to be sized based on required production assembly requirements by using one or more emitter bulbs of appropriate length or ganging emitter bulbs together. This aspect, in addition to the mobility of the module 18 enabled by the use of an armature 16 capable of articulation, can allow for a high volume of paint, sealant, or adhesive stripping production in many different settings.

Various types of suitable IR-emitting modules that utilize carbon filaments as the IR emitter are commercially available, for example, the M110 infrared module commercially available from Heraeus Noblelight LLC. M110 infrared modules are described as having emitter bulbs with one or more carbon filaments that generate short-wavelength infrared radiation at a peak wavelength of about 2.2 micrometers. Bulbs of the M110 infrared module are described are enclosed in a ventilated, fan-cooled housing having a width of about 110 millimeters and a length of up to about 3 meters. The M110 infrared module is also described as available with interior reflectors that direct and focus the infrared radiation emitted by its bulbs, and a controller capable of accurately adjusting the temperature of a targeted object based on the temperature of its bulbs. However, the literature relating to the M110 infrared module appears to describe the module as suitable for applications such as thermal processing, drying coatings, and processing foodstuffs, and there is no mention of paint, sealant, or adhesive stripping. However, investigations leading to the present invention evidenced that, depending on the substrate material, the M110 infrared module is capable of stripping paints, sealants, and adhesives if operated between 40% and 100% of its rated power level to control the IR radiation wavelengths it generates to have a peak in the range of 1.7 to 3 micrometers.

The base 12 is represented in FIG. 1 as being adapted to be mounted above the platform 14, for example, to a ceiling in an enclosure (not shown) in which the platform 14 is located for use. The armature 16 represented in FIG. 1 is an articulating armature comprising multiple segments that are connected to each other in series to allow for pivoting movement between adjacent segments. In the particular embodiment shown, the armature 16 includes an upper segment 24A and three lower segments 24B, 24C, and 24D. The upper segment 24A is preferably connected to the base 14 for rotational movement of the segment 24A about its longitudinal axis. The lower segments 24B, 24C, and 24D are pivotally connected to each other and to the upper segment 24A to provide three-dimensional movement of the module 18 relative to the base 12. The segment 24D directly coupled to the module 18 preferably enables the module 18 to be rotated in a horizontal plane so that the housing 22 can be rotated while its opening 20 continues to face directly downward. In this manner, the module 18 is able to be freely positioned and oriented by an operator by simply grasping and positioning the module 18 in three dimensions (upward-downward, laterally side-to-side, and forward-rearward) to emit infrared radiation toward the surface of a wooden or metal article on the platform 14 below the module 18.

Figure 4:
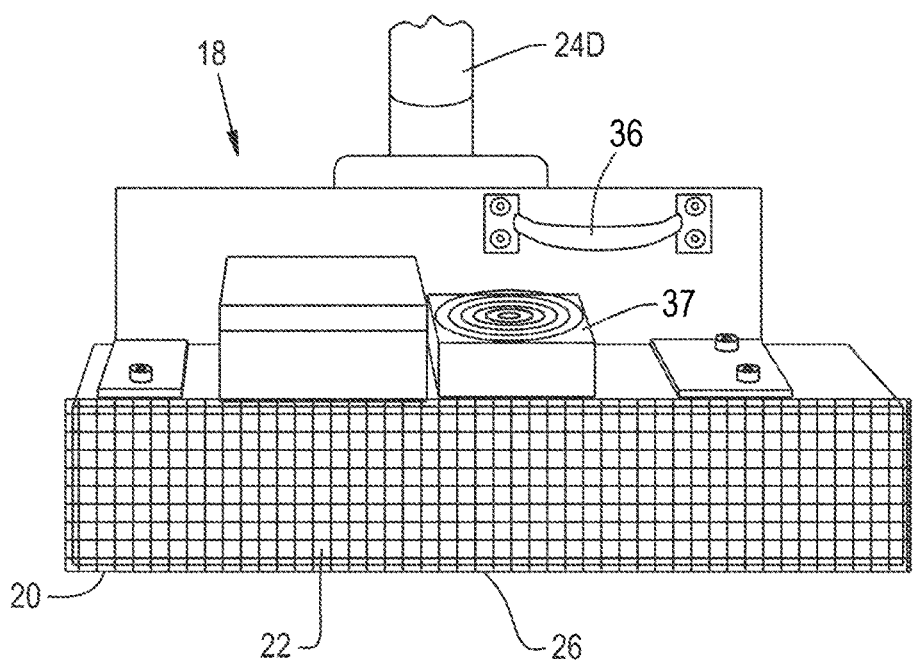
Figure 5:
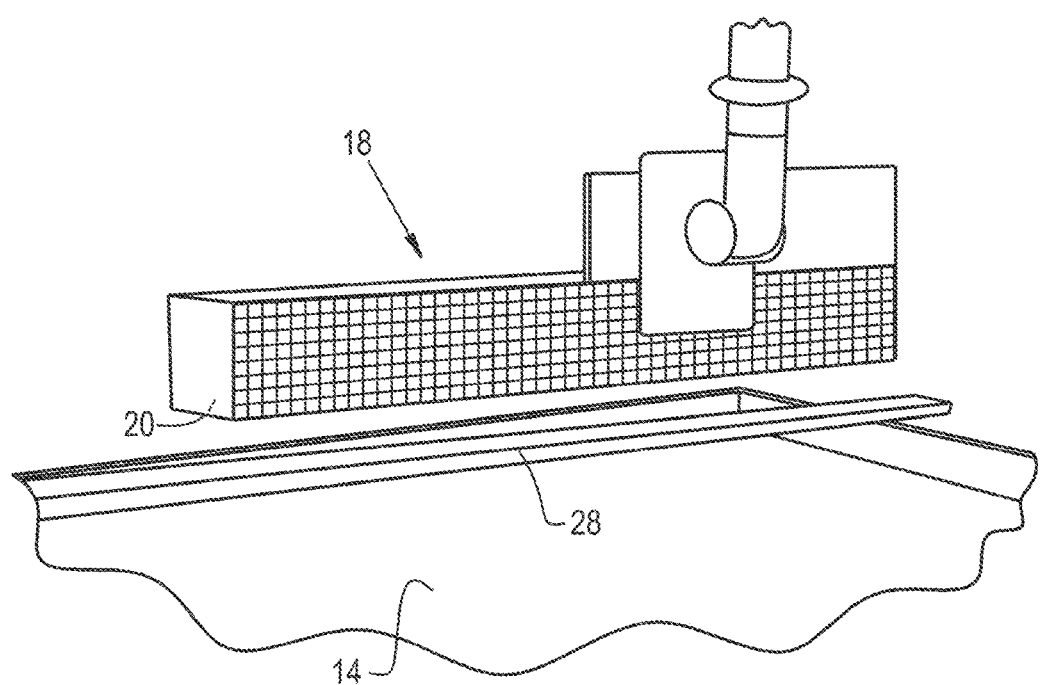
FIG. 5 depicts the infrared radiation module of FIGS. 2 through 4 during use to remove paint, sealant, and/or adhesive from a surface of an article.

FIGS. 2 through 5 represent an embodiment of the invention in which two apparatuses 10 of the type shown in FIG. 1, each equipped with the infrared module 18, are mounted above a single platform 14 to simultaneously perform the removal of paint, sealant, or adhesive on two separate articles supported by the platform 14. From FIGS. 3 through 5, it can be seen that the housing 22 is surrounded by a cage barrier 26 that protectively encloses the carbon infrared emitter bulb(s) 34 within the housing 22 of the module 18. In FIG. 4, the module 18 can be seen to include a handle 36 that enables a user to position the module 18 where desired, and a fan 37 to regulate the temperate within the housing 22. FIG. 5 depicts the module 18 in operation, whereby a wooden or metal article 28 having a layer of paint, sealant, or adhesive on its upper surface (facing the module 18) is supported on the platform 14. The armature 16 has been three-dimensionally manipulated relative to the base 12 to locate the module 18 relative to the article 28 and position the module 18 a prescribed distance from the upper surface of the article 28. In practice, a distance of about two to six inches (about 5-15 cm) between the lower opening 20 of the housing 22 and the upper surface of the article 28 has been shown to be effective, though it is foreseeable that shorter and longer distances could be used. In FIG. 5, it can be seen that the module 18 has also been rotated in the horizontal plane so that the longitudinal extent of the opening 20 (not visible) in the module housing 22 is substantially parallel to the article 28. Once properly positioned, the module 18 is operated to control the intensity and wavelengths of the infrared radiation emitted by its carbon infrared emitter bulbs (not shown), which in turn determine the temperature of a targeted paint, sealant, or adhesive layer being heated on a wooden or metal article. Consequently, the module 18 is operated to control the intensity and wavelengths of the infrared radiation of the emitter bulb(s) 34 so that the infrared radiation is emitted at a sufficient intensity and at appropriate wavelengths and can be directed at the article 28 for a sufficient period of time to heat the paint, sealant, or adhesive to a temperature at which the paint, sealant, or adhesive softens and can be easily removed.

In practice, a power density (infrared intensity) of about 110 kW/m², IR radiation wavelengths having a peak in the range of 1.7 to 3 micrometers, and exposure durations of about 30 to about 120 seconds have been shown to be adequate to remove one or more layers of paint, sealant, or adhesive from wooden and metal articles when surfaces of the articles are heated to a temperature in a range of about 200 to 500° F. (about 90 to 260° C.). Temperatures near the lower end of this range, for example, about 260±20° F. (about 125±10° C.), are typically (but not necessarily) preferred for wooden substrates, whereas temperatures toward the upper end of the range, for example, about 300 to 500° F. (about 150 to 260° C.), may be more suitable and effective for metal substrates. As such, other power densities, durations and temperatures are foreseeable, particularly as they can be influenced various factors, nonlimiting examples of which include the age of the paint, sealant, or adhesive, the type of paint, sealant, or adhesive, the type and content of solvent in the paint, sealant, or adhesive, and the color of the paint, sealant, or adhesive. In investigations leading to the present invention, various paints, sealants, and adhesives were successfully removed from various wooden substrates when heated at about 250° F. (about 120° C.) for about 30 seconds and successfully removed from various metal substrates, including steel alloys, galvanized steels, and other iron-based alloys, when heated at about 400° F. (about 200° C.) for about 120 seconds. In addition, aircraft "belly" tape (e.g., acrylic adhesive) was successfully removed from aluminum alloy surfaces of aircrafts when heated at about 250° F. (about 120° C.) for about 90 seconds. Such investigations also indicated that paints, sealants, and adhesives can be removed from other substrate materials, including plaster, stone, and brick, by appropriately adjusting the temperature (e.g., about 400 to 700° F. (about 200 to 375° C.) and duration of the infrared radiation treatment. As particular examples, paints, sealants, and adhesives have been successfully removed from masonry and plaster substrates when heated at about 400° F. (about 200° C.) for about 180 seconds. A layer of paint, sealant, or adhesive can be removed once it attains the appropriate temperature (as disclosed above), at which point the paint, sealant, or adhesive has become sufficiently softened and may begin to visibly change and, in some cases, moisture within the layer begins to evaporate. Thereafter, the layer of paint, sealant, or adhesive can be readily removed from the surface of the article 28, for example, with a putty knife or blade.

Figure 6:
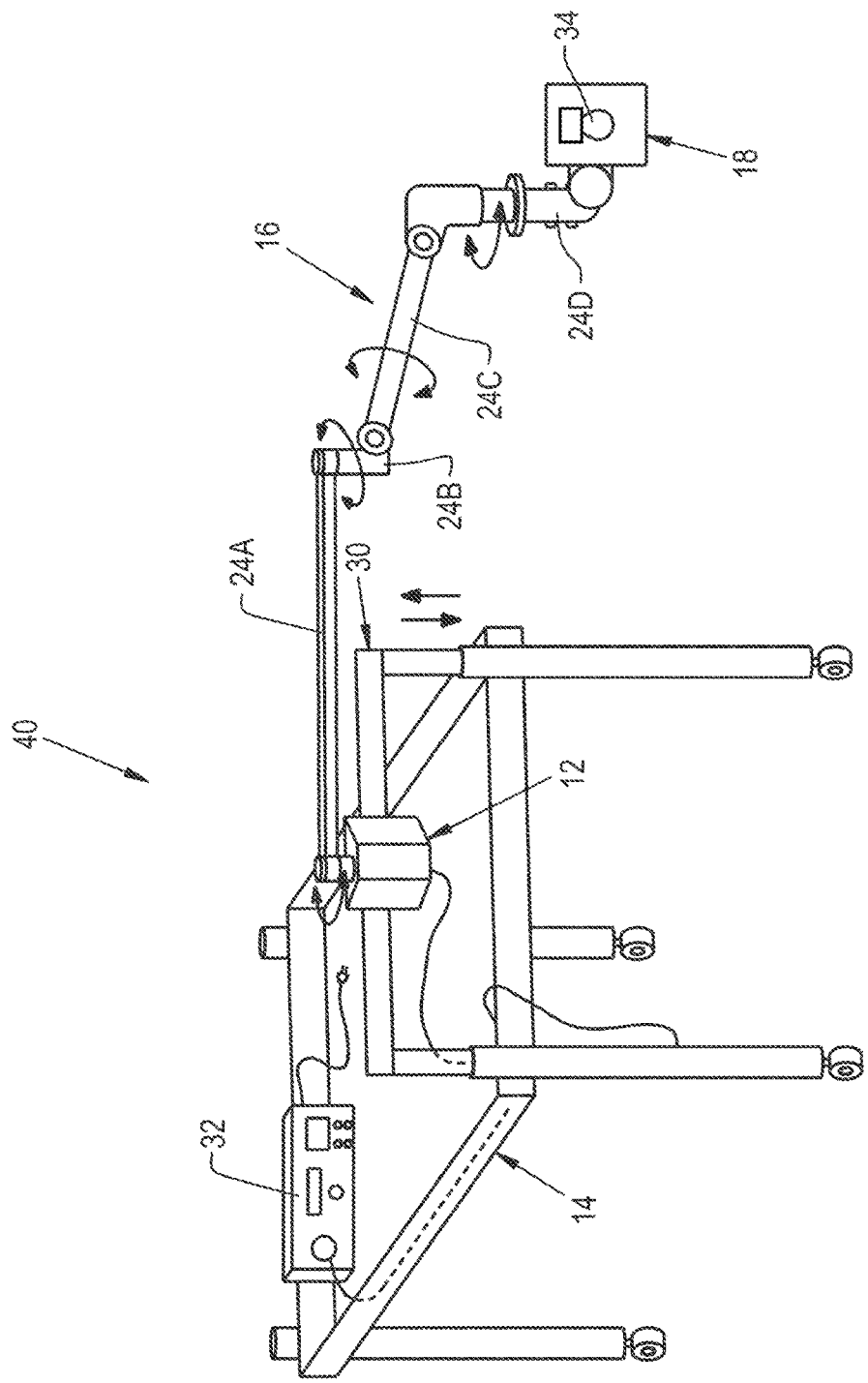
FIGS. 6 and 7 are schematic representations of two mobile apparatuses equipped with infrared radiation modules in accordance with additional nonlimiting embodiments of this invention.
Figure 7:
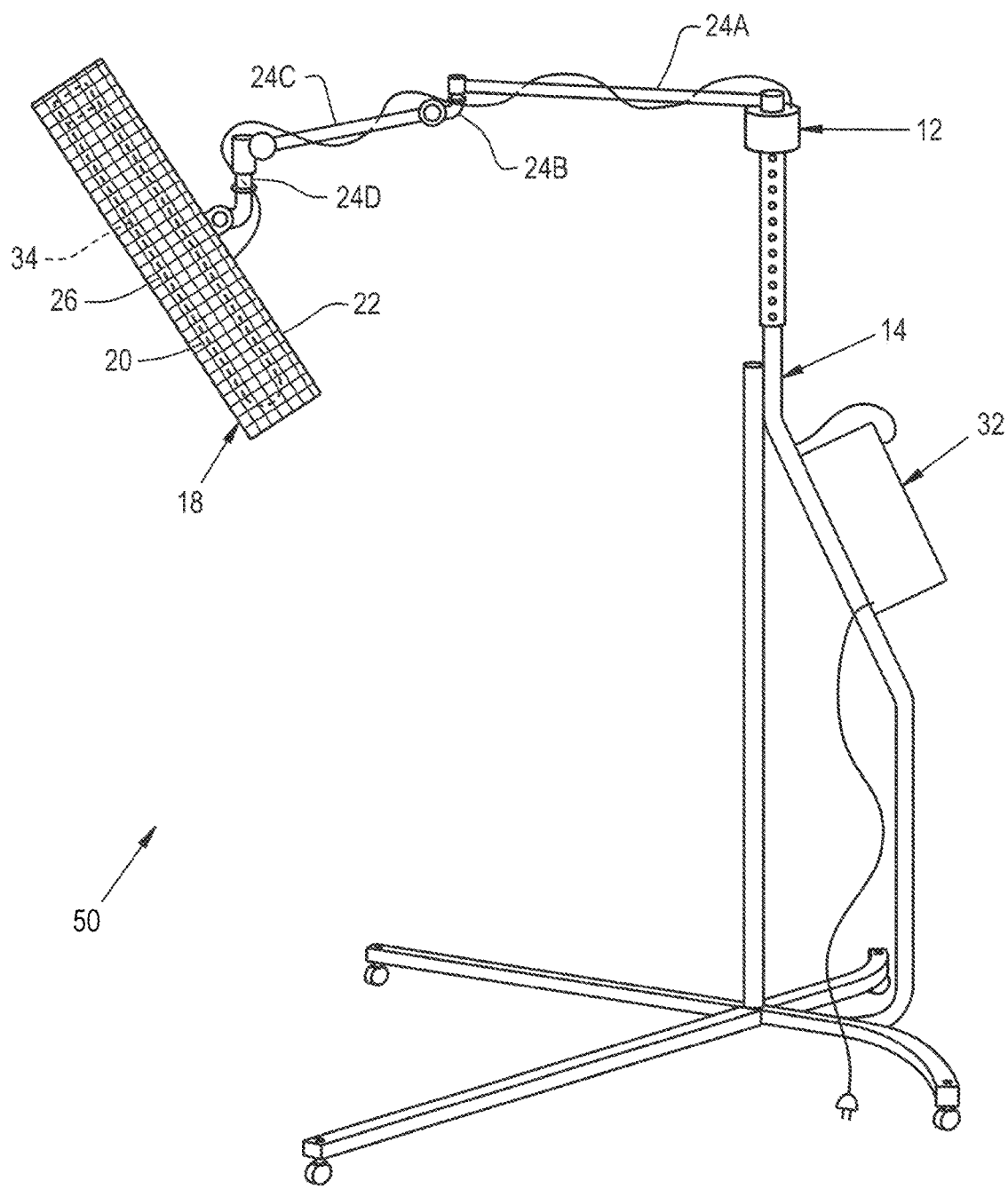

The apparatus 10 represented in FIGS. 1 through 5 is particularly well suited for permanent installation in an industrial setting, for example, within an enclosure, and for removing paint, sealant, or adhesive from articles that have been removed from a building and optionally partially or completely disassembled, for example, frame members of a window that have been disassembled from each other and from the glass panes of the window. As alternatives, FIGS. 6 and 7 represent two embodiments of apparatuses 40 and 50 that comprise components that are analogous to the apparatus 10 of FIGS. 1 through 5, but the apparatuses 40 and 50 are configured as mobile units. In these embodiments, the bases 12 of the apparatuses 40 and 50 are mounted to their respective platform 14 instead of to an overhead structure. As such, these mobile units can be sized and configured to be transported and used at multiple different job sites.

In FIG. 6, the base 12 is mounted to a frame 30 of the platform 14 that can be vertically adjusted to enable vertical movement of the base 12 and the module 18 mounted thereto by the armature 16. The segments 24A, 24B, 24C, and 24D are pivotally connected to each other and to the base 12 to provide three-dimensional movement of the module 18 relative to the base 12, and the segment 24D directly coupled to the module 18 preferably enables the module 18 to be rotated in a horizontal plane. The platform 14 is depicted as also supporting a control unit 32 that supplies power to the module 18, including controlled power to the carbon infrared emitter bulb(s) 34 of the module 18 to control the wavelengths and intensity of the infrared radiation generated by the bulb(s) 34. In this embodiment, an article (not shown) may but is not required to be placed on the platform 14, and instead the armature 16 can be used to manipulate the module 18 to direct IR radiation at a surface adjacent the apparatus 40, for example, a window frame that remains installed on a building.

In FIG. 7, the base 12 is mounted to a platform 14 in the form of a tripod that can be vertically adjusted to enable vertical movement of the base 12 and the module 18 mounted thereto. The segments 24A, 24B, 24C, and 24D are again pivotally connected to each other and to the base 12 to provide three-dimensional movement of the module 18 relative to the base 12, and the segment 24D directly coupled to the module 18 enables the module 18 to be rotated in a plane. A separate platform for supporting an article to be processed is an optional component of the apparatus 50 of FIG. 7, and in some cases the platform (tripod) 14 can be used to support an article during the removal of paint, sealant, or adhesive from its surface. In the absence of such a support platform, the control unit 32 that supplies power to the module 18 can be directly mounted to the tripod 14 as shown. As with the embodiment of FIG. 6, the armature 16 can be used to manipulate the module 18 to direct IR radiation at a surface adjacent the apparatus 50, for example, a window frame that remains installed on a building. For this purpose, FIG. 7 represents the ability of the armature 16 to orient the lower opening 20 of the module housing 22 in other than the downward direction, such that infrared radiation emitted by its carbon infrared emitter bulb 34 can be directed in directions other than downward, for example, horizontally toward a window frame installed in a building.

Figure 8:
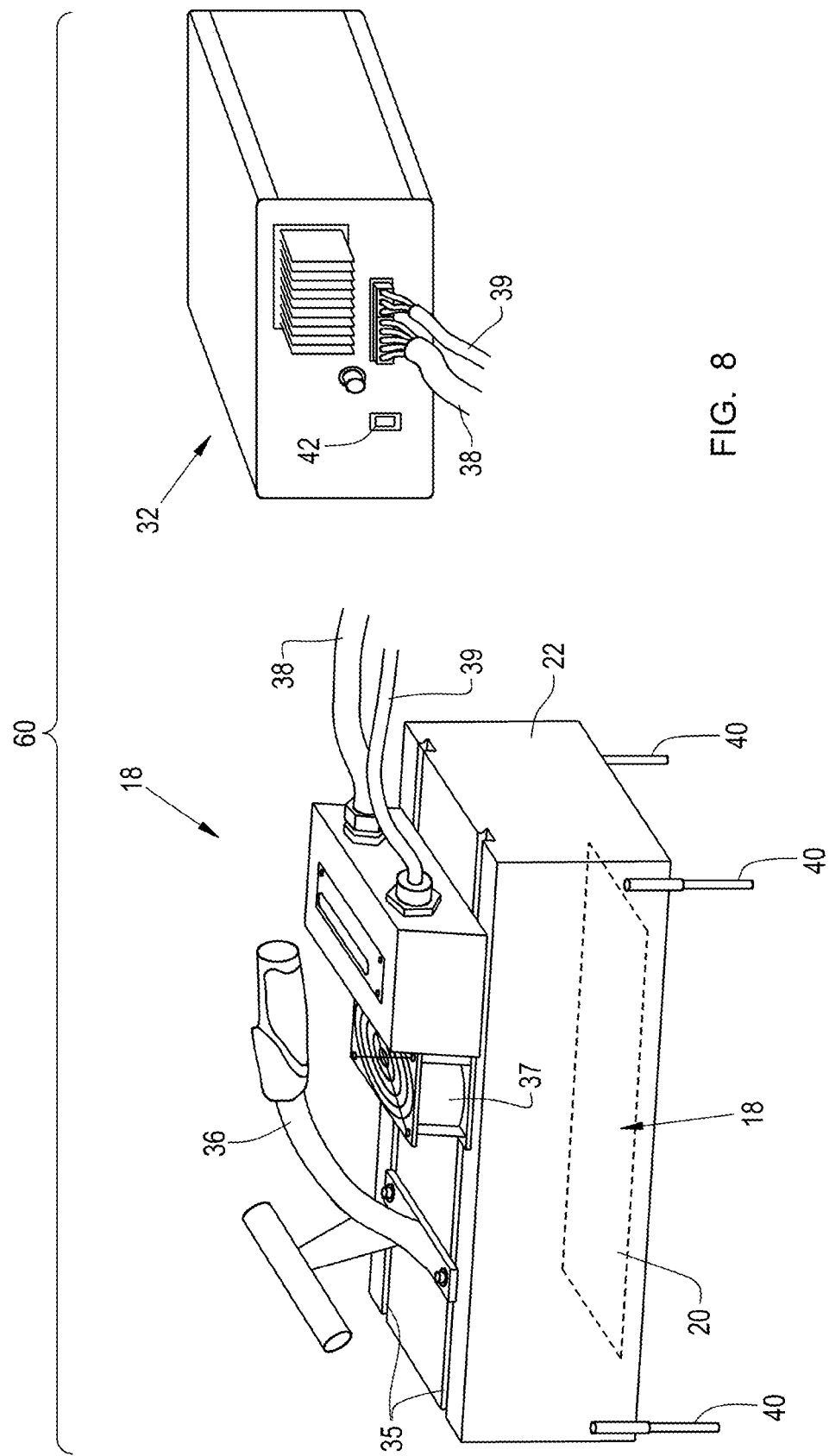
FIG. 8 is a schematic representation of a handheld apparatus equipped with an infrared radiation module in accordance with another nonlimiting embodiment of this invention.

FIG. 8 represents a further embodiment of an apparatus 60 that comprises components that are analogous to the apparatuses 10, 40, and 50 of FIGS. 1 through 7, but the apparatus 60 is configured as a handheld unit. In this embodiment, the apparatus 60 does not require a base, platform, or overhead structure. As such, the handheld unit of FIG. 8 can be sized and configured to be transported by hand and used at multiple different job sites.

In FIG. 8, the module 18 includes a handle 36 adapted to be grasped by a user to position the module 18 where desired. The module 18 further includes multiple legs 40 extending from its lower surface where the opening 20 is located and through which infrared radiation is emitted by the one or more carbon infrared emitter bulbs 34 (not shown) of the module 18. The legs 40 preferably have adjustable lengths to position the opening 20 a desired distance from a surface of an article, which enables the distance between the emitter bulbs 34 and a layer of paint, sealant, or adhesive to be accurately set and maintained to achieve a more consistent radiation intensity output as well as reduce the effort needed to steadily hold the module 18 in relation to the article's surface. As with the embodiments of FIGS. 1 through 7, the control unit 32 controls the intensity and wavelengths of the infrared radiation generated by the bulb(s) 34, and is connected to the module 18 through cables 38 and 39, one of which supplies power to the carbon infrared emitter bulb(s) 34 while the other supplies power to the fan 37 that regulates the temperate within the housing 22. The handle 36 is mounted to rails 35 on the upper surface of the housing 22 to enable the handle 36 to be repositioned or removed as may be desired. Power to the module 18 is toggled with a switch 42 on the control unit 32.

While the invention has been described in terms of specific embodiments, it is apparent that other forms could be adopted by one skilled in the art. For example, the physical configuration of the apparatuses 10, 40, 50, and 60 could differ from those shown, functions of certain components of the apparatuses 10, 40, 50, and 60 could be performed by components of different construction but capable of a similar (though not necessarily equivalent) function, and process parameters such as temperatures and durations could be modified. As such, it should be understood that the above detailed description is intended to describe the particular embodiments represented in the drawings and certain but not necessarily all features and aspects thereof, and to identify certain but not necessarily all alternatives to the embodiments and described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings, and the phraseology and terminology employed above are for the purpose of describing the illustrated embodiments and investigations and do not necessarily serve as limitations to the scope of the invention. Therefore, the scope of the invention is to be limited only by the following claims.

The invention claimed is:

1. A method of removing a layer of paint, sealant, or adhesive from a surface of a wooden or metal article, the method comprising:
    generating infrared radiation with at least one carbon infrared emitter bulb, the at least one carbon infrared emitter bulb having a maximum rated power level;
    emitting the infrared radiation through an opening of a module that contains the at least one carbon infrared emitter bulb;
    controlling, by means of a control unit that supplies controlled power to the at least one carbon infrared emitter bulb and is configured to adjust a temperature of the layer on the article by controlling intensity and wavelengths of the infrared radiation generated by the at least one carbon infrared emitter bulb, the intensity of the infrared radiation and the wavelengths of the infrared radiation to have a peak in a range of 1.7 to 3 micrometers by regulating the at least one carbon infrared emitter bulb with the control unit to maintain a power setting of less than the maximum rated power level to selectively attain the temperature of the layer in a range of about 90 to 375° C. while the article is located a distance from the opening of the module;
    emitting the infrared radiation for a period of time sufficient to soften the layer on the article while regulating the at least one carbon infrared emitter bulb with the control unit to adjust the temperature of the layer by maintaining the power setting at less than the maximum rated power level to control the intensity and the wavelengths of the infrared radiation; and
    removing the layer from the article.

2. The method according to claim 1, wherein the article is a wooden article and by regulating the power setting of the at least one carbon infrared emitter bulb the intensity of the infrared radiation is controlled and the wavelengths of the infrared radiation are controlled to have a peak in a range of 2.7 to 3 micrometers to attain a temperature in a range of about 115 to 135° C.

3. The method according to claim 1, wherein the article is a metal article and by regulating the power setting of the at least one carbon infrared emitter bulb the intensity of the infrared radiation is controlled and the wavelengths of the infrared radiation are controlled to have a peak in a range of 1.7 to 2 micrometers to attain a temperature in a range of about 150 to 260° C.

4. The method according to claim 3, wherein the surface of the metal article is formed of a steel alloy, a galvanized steel, or an aluminum alloy.

5. The method according to claim 1, wherein the distance is about 5 to 15 centimeters.

6. The method according to claim 1, wherein the period of time is about 30 to about 180 seconds.

7. The method according to claim 1, wherein the article is chosen from the group consisting of wooden windows, frames, trim, and doors of residential, commercial, industrial, and military buildings.

8. The method according to claim 1, wherein the article is chosen from the group consisting of metal grilles, railings, and safety barriers of residential, commercial, industrial, and military structures.

9. The method according to claim 1, wherein the article is a surface of an aircraft.

10. The method according to claim 9, wherein the layer is belly tape on the surface of the aircraft.

11. The method according to claim 1, wherein the step of controlling comprises regulating the at least one carbon infrared emitter bulb to maintain the power setting to between about 40% and less than 100% of the maximum rated power level throughout the period of time.

12. The method according to claim 1, wherein the step of controlling comprises regulating the at least one carbon infrared emitter bulb so that the power setting thereof maintains a power density of about 110 $kW/m^2$ throughout the period of time.

13. A method of removing a layer of paint, sealant, or adhesive from a surface of a plaster, stone, or brick article, the method comprising:
    generating infrared radiation with at least one carbon infrared emitter bulb, the at least one carbon infrared emitter bulb having a maximum rated power level;
    emitting the infrared radiation through an opening of a module that contains the at least one carbon infrared emitter bulb;
    controlling, by means of a control unit that supplies controlled power to the at least one carbon infrared emitter bulb and is configured to adjust a temperature of the layer on the article by controlling intensity and wavelengths of the infrared radiation generated by the at least one carbon infrared emitter bulb, the intensity of the infrared radiation and the wavelengths of the infrared radiation to have a peak in a range of 1.7 to 3 micrometers by regulating the at least one carbon infrared emitter bulb with the control unit to maintain a power setting of less than the maximum rated power level to selectively attain the temperature of the layer in a range of about 200 to 375° C. while the article is located a distance from the opening of the module;
    emitting the infrared radiation for a period of time sufficient to soften the layer on the article while regulating the at least one carbon infrared emitter bulb with the control unit to adjust the temperature of the layer by maintaining the power setting at less than the maximum rated power level to control the intensity and the wavelengths of the infrared radiation; and
    removing the layer from the article.

* * * * *